United States Patent [19]
Keating

[11] Patent Number: 5,470,112
[45] Date of Patent: Nov. 28, 1995

[54] ADJUSTABLE COUPLING RING

[75] Inventor: Henry M. Keating, St. Clair Shores, Mich.

[73] Assignee: Keating Koupling, Inc., Six Mile, S.C.

[21] Appl. No.: 328,022

[22] Filed: Oct. 24, 1994

[51] Int. Cl.⁶ .................................................. F16L 35/00
[52] U.S. Cl. ........................... 285/24; 285/177; 285/331; 285/398; 285/424
[58] Field of Search ................................. 285/331, 177, 285/424, 24, 398

[56] References Cited

U.S. PATENT DOCUMENTS

| | | |
|---|---|---|
| 180,416 | 8/1876 | Clow . |
| 394,479 | 12/1888 | Evans et al. . |
| 1,762,766 | 3/1928 | De Garay . |
| 1,811,277 | 6/1929 | Mosley . |
| 1,921,642 | 7/1931 | Stephenson . |
| 2,275,572 | 5/1939 | Somers . |
| 2,535,186 | 12/1946 | Anderson . |
| 3,246,918 | 9/1963 | Burghart . |
| 3,415,543 | 12/1968 | Keating . |
| 3,689,114 | 9/1972 | Meserole . |
| 3,905,621 | 7/1974 | DeMarco . |
| 4,249,758 | 2/1981 | Harris . |
| 4,447,078 | 5/1984 | Jenkins . |
| 4,558,892 | 12/1985 | Daw et al. . |
| 4,566,724 | 1/1986 | Arnoldt et al. . |
| 4,669,762 | 6/1987 | Jenkins . |
| 4,941,693 | 7/1990 | Spaude et al. . |
| 5,054,823 | 10/1991 | Arnoldt . |
| 5,129,690 | 7/1992 | Melnig .............................. 285/424 X |
| 5,133,580 | 7/1992 | Melnig .............................. 285/424 X |
| 5,213,374 | 5/1993 | Keating .............................. 285/424 X |
| 5,378,028 | 1/1995 | Havai et al. ..................... 285/424 |

Primary Examiner—Dave W. Arola
Attorney, Agent, or Firm—Brooks & Kushman

[57] ABSTRACT

A coupling ring for joining circular sheet metal ducts has oppositely opening grooves for receiving meeting ends of the ducts, and is diametrically adjustable to accommodate variations in the duct diameters.

3 Claims, 1 Drawing Sheet

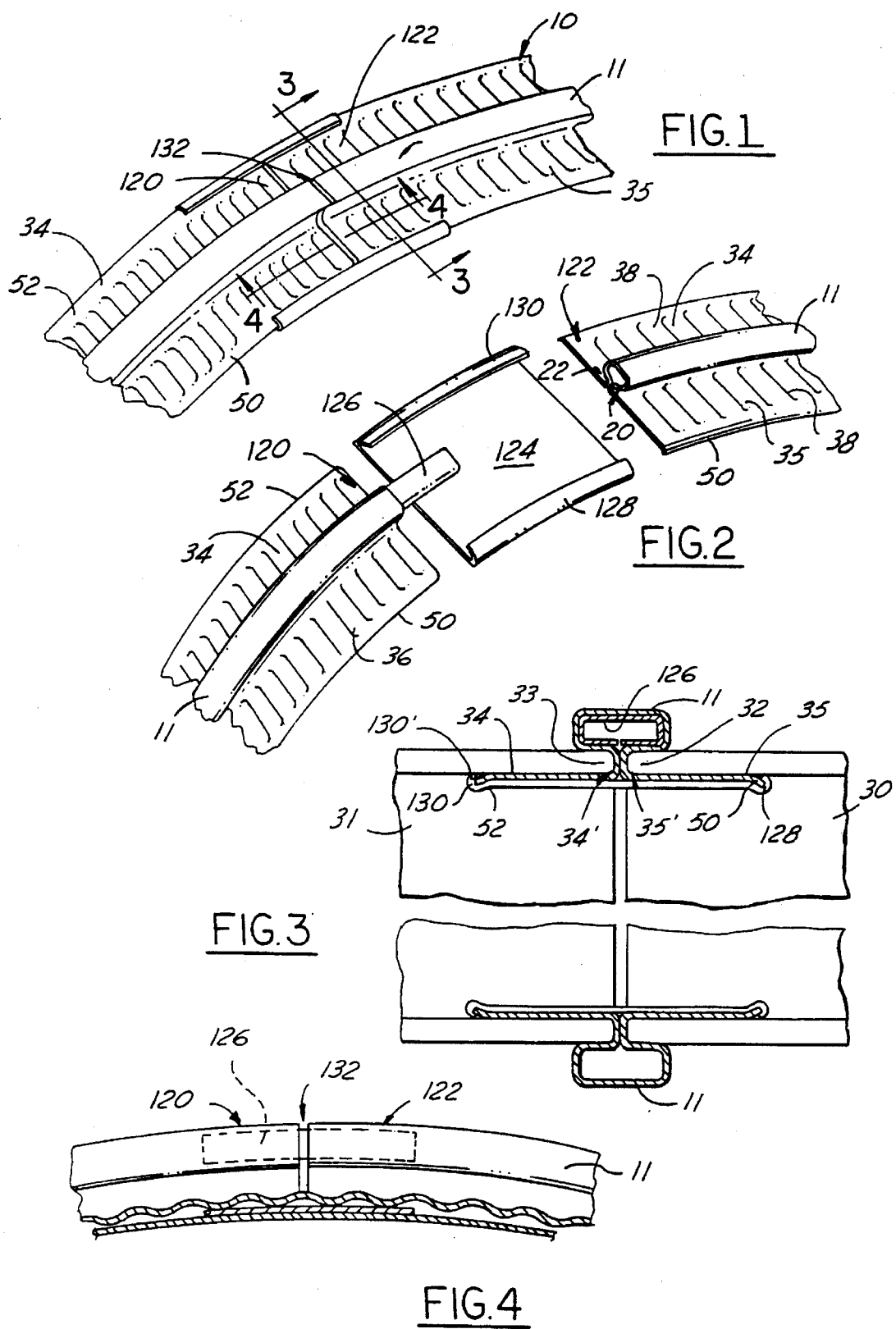

ADJUSTABLE COUPLING RING

FIELD OF INVENTION

This invention relates to improvements in coupling rings for joining circular air ducts.

BACKGROUND OF THE INVENTION

U.S. Pat. No. 5,213,374, which I incorporate herein by reference, discloses a coupling ring for joining circular air ducts. While the ring is enjoying increasing commercial success, I have discovered that variations in the actual diameter of the ducts to be connected may vary sufficiently from the nominal diameter that the workmen may have difficulty inserting the duct ends into the oppositely opening grooves of the coupling ring. Thus a coupling ring for an 18" duct may not, on occasion, fit properly with nominal 18" round ducts, or a coupling ring for 30" duct may not always fit with nominal 30" round ducts. While insistence that the duct manufacturers hold more closely the allowable tolerances on the duct diameters may be helpful, I have found that by a modification of the coupling ring itself, I am able to accommodate the variations being experienced in the duct diameters.

SUMMARY OF THE INVENTION

In manufacturing the coupling ring disclosed in the aforesaid patent, the meeting ends of the strip following hooping are brought into alignment as at 106 in FIG. 4, and a butt block 108 is spot welded thereto on the inside of the ring, securely and permanently fastening the ends of the strip together to form the ring. Thus, the diameter of the ring is fixed during its manufacture, and the diameter of the ducts 30 and 31 cannot vary appreciably, not more than about ⅛", or there will be interference when it is sought to insert the duct ends into the coupling grooves.

I have discovered that it is not necessary to permanently secure the meeting ends of the strip as at 106 in FIG. 4 of U.S. Pat. No. 5,213,374, but rather they may be slidably, adjustably joined such that upon presenting the duct ends to the ring, the diameter of the ring may be varied on the spot, to accommodate the diameter of the duct, and installation of the ductwork may continue without interruption. The slidable joint at the meeting ends of the strip-may be effected in various ways, but I have found that a joiner comprising a cleat-like plate bridging the joint on the inside of the ring and slidably embracing opposite distal edges of the strip flanges, together with a tongue received in the meeting ends of the rib 11, is very satisfactory.

BRIEF DESCRIPTION OF THE DRAWINGS

FIG. 1 is a perspective view of a portion of the coupling ring taken at the joint between the juxtaposed ends and showing the ends slightly spaced apart;

FIG. 2 is similar to FIG. 1 except the ends have been pulled apart to show the joining elements;

FIG. 3 is a cross-sectional view taken on the line 3—3 of FIG. 1; and

FIG. 4 is a cross-sectional view taken on the line 4—4 of FIG. 1.

DESCRIPTION OF THE PREFERRED EMBODIMENT

As mentioned above, this invention constitutes an improvement in the coupling ring of U.S. Pat. No. 5,213,374 and accordingly reference to such patent should be made in reviewing this disclosure for a full understanding of the subject matter. To facilitate understanding, like reference numerals will be used here as in such patent where feasible.

As thus disclosed, a coupling ring 10, for receiving and joining circular ducts 30 and 31 at their meeting ends 32 and 33, is formed of a single piece of sheet metal shaped to provide oppositely extending cylindrical flanges 34 and 35 (sometimes referred to as 36 in U.S. Pat. No. 5,213,374). A channel-shaped annular rib 11 encircles the flanges 34 and 35 at their proximal ends 34' and 35', connecting them together. Axially outwardly opening grooves 20 and 22 at opposite sides of the rib 11 and located at the connection between the rib and flanges, are adapted to receive the ends 32 and 33 of the ducts which are telescoped therein. Fasteners such as screws 74 hold the duct ends 32 and 33 in the grooves. Each flange is circumferentially crimped as at 36 and 38 between the grooves 20 and 22 and the distal ends or edges 50 and 52 to facilitate forming the strip into a cylindrical or annular shape.

In the embodiment of U.S. Pat. No. 5,213,374 the juxtaposed ends of the strip, where they meet as at 106 (FIG. 4 of such Patent), are permanently joined by a butt block 108 which is spot welded to the strip on the inside thereof. Thus the diameter of such coupling ring is fixed, and while it may accept duct ends which may vary in diameter by as much as ⅛", greater variations render the connection difficult or impossible, and in all events delay assembly of the ductwork, and thereby increase labor costs for such assembly.

I have discovered this problem may be overcome by slidably connecting the juxtaposed ends of the strip, herein designated 120 and 122, while maintaining their alignment. As a result, the diameter of the ring may be increased or decreased on the spot to accommodate the duct diameter, and no delay is occasioned by out-of-tolerance ducts. This is illustrated in the disclosed embodiment by providing a joiner which extends between the ends 120 and 122 and serves to hold them in proper alignment while permitting slidable movement toward and from each other. At the same time the joiner fills the gap between the ends so that any appreciable air leak is prevented.

The joiner comprises a cleat 124 and a tongue 126. The cleat is formed of a plate whose lateral edges 128 and 130 are folded to embrace the distal edges 50 and 52 of the coupling ring. The folds at 126 and 128 are sufficiently sharp to hold the flanges in alignment but at the same time permit sliding action therebetween. The distal edges 50 and 52 of the flanges of the coupling ring are bent slightly inwardly as described in U.S. Pat. No. 5,213,374 to form ramps to facilitate introduction of the flanges into the ducts, and the folds at 128 and 130 terminate as at 128' and 130' so that the edges thereof lie substantially within the plane of the flange and do not adversely interfere with the ramping action of the edges 50 and 52. The cleat 124 underlies the flanges on the inside of the ring, as shown in FIG. 4, and substantially fills the gap between the ends of the flanges when they are separated as in FIGS. 1 and 4 with the gap 132 therebetween. If desired to retain the cleat on the coupling ring during handling or shipping, the cleat may be spot welded to one end of the strip and slidably received over the other end.

The tongue 126 may be solid in cross-section or hollow, as desired. In the disclosed embodiment it is hollow as shown in FIG. 3. It is sized to slidably fit within the rib 11. If desired it may be spot welded or otherwise permanently retained in the rib at one end of the strip while slidable within the opposite juxtaposed end of the strip. The fit of the tongue 126 within the rib 11 is such that the tongue maintains the juxtaposed ends of the rib in substantial alignment and also fills the gap 132 between the ends when they are separated at shown in FIG. 4.

In addition to filling the gap 132 between the juxtaposed ends of the strip when such are separated, the joiner serves to support a sealant, shown at 68 and 70 in U.S. Pat. No. 5,213,374, which is placed in the grooves 20 and 22 before the duct ends are inserted. In practice, the sealant may be placed in the grooves at the time the coupling ring is formed and will extend across the joint or gap 132 at the juxtaposed ends of the strip. If the workman finds it necessary to close or open the gap slightly to accommodate the diameter of the duct, the sealant will stretch or compress accordingly, but in each instance the sealant is supported by the joiner. I have also found that once the joint between the meeting ends of the ducts has been completed with the insertion of the fasteners 74, the joint is completely adequate, and as good as that formed by the coupling ring shown in U.S. Pat. No. 5,213,374 where the juxtaposed ends of the strip are joined by the spot welded butt plate.

While the best mode for carrying out the invention has been described in detail, those familiar with the art to which this invention relates will recognize various alternative designs and embodiments for practicing the-invention as defined by the following claims.

I claim:

1. A coupling ring for receiving and joining circular air ducts whose actual diameter may vary from the nominal diameter comprising:

an elongated strip of sheet metal folded upon itself and bent into cylindrical shape to provide oppositely extending cylindrical flanges and a channel-shaped annular rib encircling the flanges at their proximal edges and connecting them together;

axially outwardly opening grooves at opposite sides of the rib at the connection between the rib and flanges for receiving the ends of ducts into which the flanges are telescoped for connecting the ducts;

said strip having opposite juxtaposed ends and the diameter of the ring being expansible or contractable to vary the gap therebetween;

a tongue connected to the rib at said juxtaposed ends and extending therebetween to bridge the gap and hold the ends in alignment and slidable in respect of at least one such end;

a cleat in the form of a plate extending between said juxtaposed ends on the inside of the ring from the rib and bridging the gap between such ends;

and said cleat having lateral edges shaped to embrace the distal edges of the flanges to hold them in alignment while allowing slidable adjustment between such ends during variations in the gap between them.

2. A coupling ring for receiving and joining circular air ducts whose actual diameter may vary from the nominal diameter comprising:

an elongated strip of sheet metal folded upon itself and bent into cylindrical shape to provide oppositely extending cylindrical flanges and a channel-shaped annular rib encircling the flanges at their proximal edges and connecting them together;

axially outwardly opening grooves at opposite sides of the rib at the connection between the rib and flanges for receiving the ends of ducts into which the flanges are telescoped for connecting the ducts;

said strip having opposite juxtaposed ends with a gap therebetween which varies with the diameter of the ring;

a tongue extending across said gap at the juxtaposed ends of the strip and connected to said rib for holding the rib in alignment at such ends and with the connection between such tongue and at least one end of the rib being a sliding connection;

a cleat in the form of a plate underlying the strip on the opposite side thereof from the rib and extending across said gap and embracing the distal edges of said flanges to hold the same in alignment at the gap; and said cleat being slidably connected to the strip at least at one end of the juxtaposed ends whereby the gap may be varied while the cleat bridges the gap and holds the juxtaposed ends in alignment.

3. The invention defined by claim 2 wherein the rib is hollow adjacent the juxtaposed ends of the strip, and said tongue is slidably received in the rib at such ends and extends across any gap between the juxtaposed ends of the strip to align the rib and fill such gap.

* * * * *